(12) United States Patent
Oba et al.

(10) Patent No.: US 12,320,776 B2
(45) Date of Patent: Jun. 3, 2025

(54) GAS SENSOR

(71) Applicant: NGK SPARK PLUG CO., LTD., Nagoya (JP)

(72) Inventors: Takehiro Oba, Nagoya (JP); Masana Okai, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 511 days.

(21) Appl. No.: 17/276,699

(22) PCT Filed: Feb. 8, 2019

(86) PCT No.: PCT/JP2019/004623
§ 371 (c)(1),
(2) Date: Mar. 16, 2021

(87) PCT Pub. No.: WO2020/066051
PCT Pub. Date: Apr. 2, 2020

(65) Prior Publication Data
US 2022/0026388 A1 Jan. 27, 2022

(30) Foreign Application Priority Data
Sep. 25, 2018 (JP) ................................. 2018-178401

(51) Int. Cl.
*G01N 27/406* (2006.01)
*G01M 15/10* (2006.01)
(Continued)

(52) U.S. Cl.
CPC ........ *G01N 27/416* (2013.01); *G01M 15/104* (2013.01); *G01N 27/4062* (2013.01); *G01N 27/407* (2013.01); *G01N 27/409* (2013.01)

(58) Field of Classification Search
CPC ..... G01N 27/416; G01N 27/406–4062; G01N 27/407; G01N 27/409; G01M 15/104
See application file for complete search history.

(56) References Cited

U.S. PATENT DOCUMENTS 5,573,650 A * 11/1996 Fukaya .............. G01N 27/4062
204/426
8,771,488 B2 7/2014 Ito et al.
(Continued)

FOREIGN PATENT DOCUMENTS

CN 103293207 A 9/2013
JP 2007071582 A * 3/2007
(Continued)

OTHER PUBLICATIONS

Communication issued Nov. 2, 2022 by the State Intellectual Property Office of People's Republic of China for Chinese Patent Application No. 201980063057.7.
(Continued)

*Primary Examiner* — James Lin
*Assistant Examiner* — Vivian A Tran
(74) *Attorney, Agent, or Firm* — Sughrue Mion, PLLC

(57) ABSTRACT

A gas sensor including a plate-shaped sensor element having an electrode pad on an outer surface of the sensor element on a rear end side thereof, and a metal terminal member electrically connected to the electrode pad. The metal terminal member includes a body portion and an element abutting portion extending from the body portion and bent toward the electrode pad. A portion of the element abutting portion is in contact with the electrode pad in a state in which the element abutting portion is elastically deflected. The element abutting portion has a flat main surface facing the sensor element, and a sloping surface provided on at least one of end portions in a width direction of the metal terminal member. The sloping surface is connected to the main surface and extends toward an opposite side in a thickness direction of the element abutting portion.

11 Claims, 16 Drawing Sheets

(51) Int. Cl.
 G01N 27/407 (2006.01)
 G01N 27/409 (2006.01)
 G01N 27/416 (2006.01)

(56) References Cited

U.S. PATENT DOCUMENTS

2015/0114085 A1 4/2015 Iwano et al.
2018/0003669 A1 1/2018 Nagata et al.

FOREIGN PATENT DOCUMENTS

| JP | 2015014467 A | * | 1/2015 |
| JP | 2015152465 A | * | 8/2015 |
| JP | 2018-9958 A | | 1/2018 |

OTHER PUBLICATIONS

International Search Report dated May 7, 2019 issued by the International Searching Authority in counterpart International Application No. PCT/JP2019/004623 (PCT/ISA/210).
Communication dated Sep. 21, 2021, from the Intellectual Property Office of India in Application No. 202117010681.

* cited by examiner

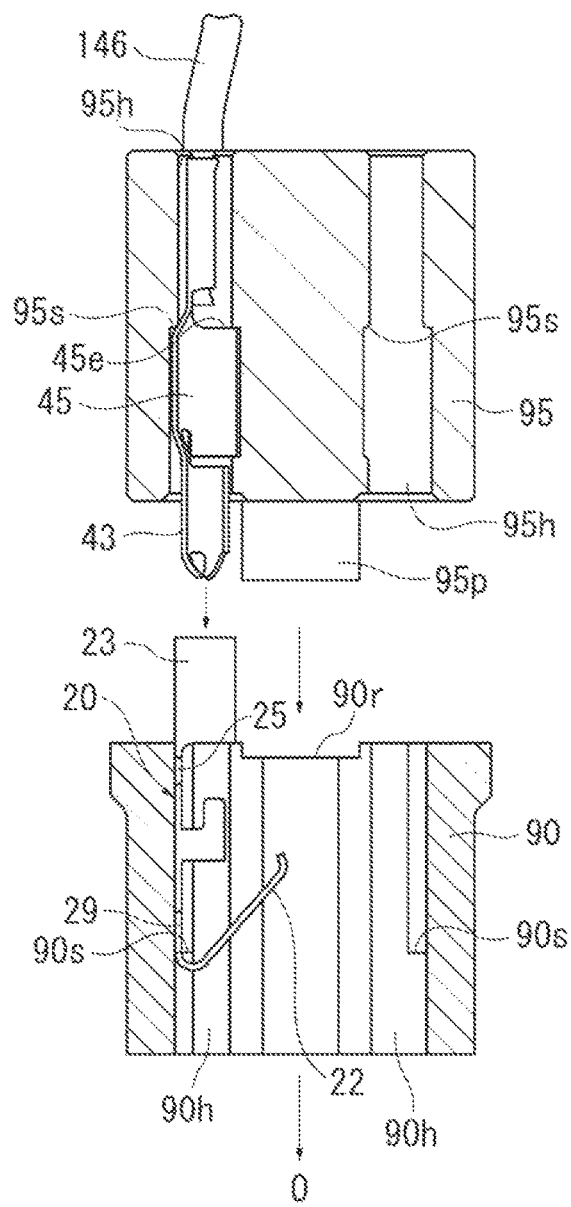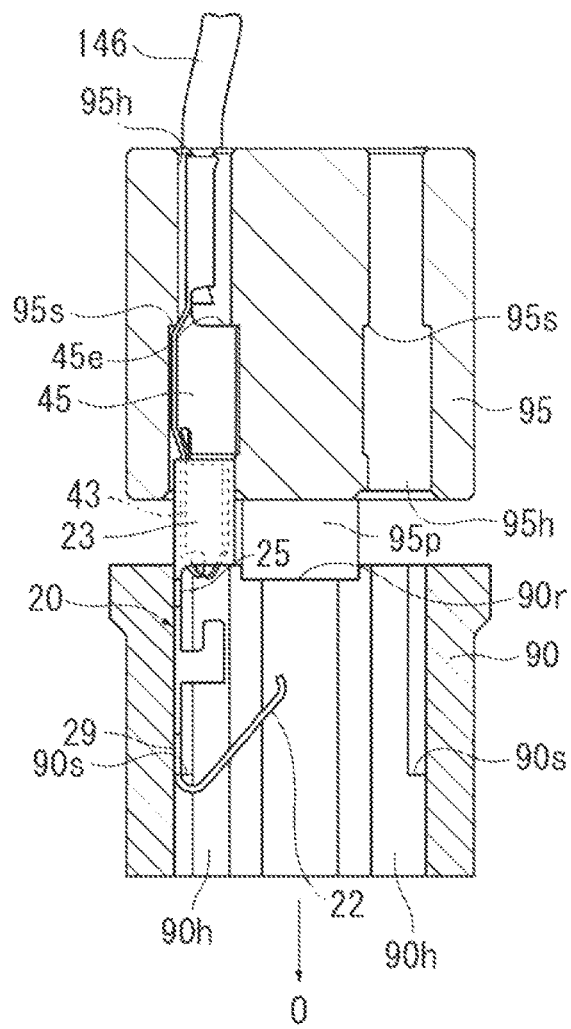
FIG. 6A
FIG. 6B

GAS SENSOR

CROSS-REFERENCE TO RELATED APPLICATIONS

This application is a National Stage of International Application No. PCT/JP2019/004623, filed Feb. 8, 2019, claiming priority based on Japanese Patent Application No. 2018-178401, filed Sep. 25, 2018.

TECHNICAL FIELD

The present invention relates to a gas sensor including a sensor element for detecting the concentration of a subject gas.

BACKGROUND ART

One known gas sensor for detecting the concentration of oxygen or NOx in exhaust gas from an automobile, etc. includes a plate-shaped sensor element that uses a solid electrolyte.

In a widely used gas sensor of this type, a plurality of electrode pads are provided on the outer surface of a rear-end portion of the plate-shaped sensor element, and metal terminal members are electrically in contact with the respective electrode pads to output a sensor output signal from the sensor element to the outside and to supply electricity to a heater stacked on the sensor element (Patent Document 1).

As shown in FIG. 18, a metal terminal member 300 is formed by, for example, cutting and bending a metal plate to have a strip form, and its forward end portion is bent toward an electrode pad 402 of a sensor element, thereby forming an element abutting portion 310 which is elastically connected to the electrode pad 402 with a pressing force D.

PRIOR ART DOCUMENT

Patent Document

Patent Document 1: Japanese Patent Application Laid-Open (kokai) No. 2018-9958 (FIGS. 2 and 3)

SUMMARY OF THE INVENTION

Problem to be Solved by the Invention

Incidentally, the case where, as shown in FIG. 19, a width W1 of the element abutting portion 310 is excessively narrow as compared with the electrode pad 402 may lead to a possibility that a contact point cannot be secured stably, and/or the element abutting portion 310 moves out of place in the width direction, for example, when the gas sensor is assembled or vibration is generated during travel, so that the element abutting portion 310 comes off an end portion of the sensor element 400.

Meanwhile, in the case where, as shown in FIG. 20, the element abutting portion 310 has an increased width W2 for the electrode pad 402, even when the element abutting portion 310 moves out of place in the width direction, the element abutting portion 310 is prevented from coming off the sensor element 400, because the element abutting portion 310 is caught by an end portion of the sensor element 400.

However, in the case where the element abutting portion 310 moves out of place while inclining with respect to the electrode pad 402, an end portion 310e of the element abutting portion 310 in the width direction abuts against a surface of the sensor element 400 located adjacent to the electrode pad 402. As a result, the element abutting portion 310 may disengage from the electrode pad 402 and fail to maintain the contact point 300P. Also, even when the contact point 300P appears to be maintained, the end portion 310e is pressed against the surface of the sensor element 400 and the pressing force D decreases, so that the pressure acting at the contact point decreases, and the connection reliability of the contact point 300P deteriorates.

In view of the forgoing, it is an object of the present invention to provide a gas sensor which can maintain the electrical connection between a metal terminal member and an electrode pad of a sensor element even when the metal terminal member moves out of place in relation to the electrode pad.

MEANS FOR SOLVING THE PROBLEM

In order to solve the above-described problem, a gas sensor of the present invention includes a plate-shaped sensor element extending in the direction of an axial line and having an electrode pad provided on an outer surface of the sensor element at a rear end side thereof; and a metal terminal member extending in the direction of the axial line and electrically connected to the electrode pad. The gas sensor is characterized in that the metal terminal member includes a body portion and an element abutting portion extending from the body portion and bent toward the electrode pad, a portion of the element abutting portion being in contact with the electrode pad in a state in which the element abutting portion is elastically deflected; and the element abutting portion has a flat main surface facing the sensor element, and a sloping surface provided on at least one of end portions of the element abutting portion in a width direction of the metal terminal member, the sloping surface being connected to the main surface and extending toward an opposite side in a thickness direction of the element abutting portion.

The element abutting portion may move out of place in relation to the electrode pad while inclining, for example, because of assembly of the gas sensor or vibration generated when a vehicle including the gas sensor mounted thereon travels. In such a case, if the element abutting portion is assumed not to have the sloping surface, its corner portion abuts against a surface of the sensor element located adjacent to the electrode pad, so that the element abutting portion disengages from the electrode pad and becomes unable to maintain the contact point.

In order to solve such a problem, in this gas sensor, the sloping surface is provided. As a result, even when the element abutting portion inclines, the element abutting portion is less likely to abut against the surface of the sensor element, and the element abutting portion is prevented from disengaging from the electrode pad and failing to maintain the contact point. Also, even when the element abutting portion inclines, the element abutting portion is less likely to abut against the surface of the sensor element. Therefore, the width of the element abutting portion can be increased accordingly. Accordingly, even when the element abutting portion moves out of place in the width direction, coming off from an end portion of the sensor element can be prevented.

By virtue of these actions, even when the metal terminal member moves out of place (moves out of place while inclining or moves out of place in the width direction) in relation to the electrode pad, the electrical connection between the metal terminal member and the electrode pad can be maintained.

In the gas sensor of the present invention, the element abutting portion may have a side surface at the end portion at which the sloping surface is formed, the side surface being connected to the sloping surface and facing outward in the width direction.

In the case where the element abutting portion has a side surface, the contact point between the sloping surface and the electrode pad is located at the terminal end of the sloping surface (the boundary between the sloping surface and the side surface) even in the case where the contact point is located closest to the body portion of the metal terminal member. Meanwhile, in the case where the element abutting portion does not have the side surface, the sloping surface is formed to extend to the opposite side of the element abutting portion in the thickness direction thereof. Therefore, the contact point between the sloping surface and the electrode pad reaches the opposite side of the main surface in the thickness direction of the element abutting portion in the case where the contact point is located closest to the body portion of the metal terminal member. Namely, in the case where the side surface is not provided, a distance between the element abutting portion and the body portion increases, and the element abutting portion expands more from the body portion. As a result, the spring force of the element abutting portion decreases, and the contact point pressure tends to decrease.

Accordingly, in this gas sensor, as a result of provision of the side surface on the element abutting portion, it is possible to prevent the decrease in the spring force of the element abutting portion and the decrease in the contact point pressure, thereby improving connection reliability.

In the gas sensor of the present invention, as viewed in the thickness direction of the element abutting portion, a thickness t1 of the sloping surface and a thickness t2 of the side surface may satisfy a relation of t1<t2.

According to this gas sensor, since the relation of t1<t2 is satisfied, the decrease in the spring force of the element abutting portion and the decrease in the contact point pressure can be prevented further.

The gas sensor of the present invention may be such that the sensor element includes a chamfered portion at a corner portion thereof in the width direction;
  the sloping surface is formed on at least the end portion on a side corresponding to a side of the electrode pad adjacent to the chamfered portion, the side of the electrode pad being located opposite the chamfered portion;
  when the chamfered portion of the sensor element has a chamfering angle $\theta 1$, an angle $\theta 2$ of the sloping surface in relation to the main surface satisfies a relation of $\theta 1 > \theta 2$; and
  one of the following two requirements is satisfied: (1) an end portion of the electrode pad is in contact with a boundary portion between the chamfered portion and the outer surface of the sensor element, and
  (2) the end portion of the electrode pad on the chamfered portion side is spaced away from the boundary portion and a relation of $\theta 3 > \theta 2$ is satisfied, where $\theta 3$ represents an angle between the outer surface and an imaginary line segment connecting the boundary portion and a corner portion of the end portion on the side toward the element abutting portion, and a distance L3 between the boundary portion and the end portion of the electrode pad is shorter than a length L2 of the sloping surface as measured parallel to the outer surface.

The element abutting portion may move out of place in the width direction so that the element abutting portion moves away from the end portion of the sensor element. In such a case, if the angle $\theta 1$ is smaller than the angle $\theta 2$, the sloping surface abuts against the chamfered portion at the end portion of the sensor element, and the element abutting portion may disengage from the electrode pad and the electrical connection between the element abutting portion and the electrode pad may be broken.

In order to solve such a problem, according to this gas sensor, the angle $\theta 1$ is made larger than the angle $\theta 2$. In this case, since a gap having a size corresponding to the angle difference ($\theta 1 - \theta 2$) is formed between the sloping surface and the chamfered portion, it is possible to prevent occurrence of a state in which the sloping surface abuts against the chamfered portion, and the element abutting portion disengages from the electrode pad and becomes unable to maintain the contact point.

In the gas sensor of the present invention, in the element abutting portion, an opposite surface located on a side opposite the main surface and the sloping surface in the thickness direction may be flat.

Such a flat surface can be obtained, for example, by forming the sloping surface by forging. The main surface and the sloping surface have larger thicknesses as compared with the case where the sloping surface is formed by press working. As a result, spring back of the main surface and the sloping surface is prevented, and the accurate shape of the sloping surface can be maintained.

In the gas sensor of the present invention, the sloping surface may be higher in hardness than the main surface.

In the case where the sloping surface is formed, for example, by sheet metal press working such that a flat surface is present, the hardness of the sloping surface becomes greater than the hardness of the main surface due to work hardening.

In the gas sensor of the present invention, an overall length L1 of the metal terminal member in the width direction and a length F1 of the main surface in the width direction may satisfy a relation of F1/L1≤0.8.

According to the gas sensor, the sloping surface can be formed to have a proper angle in relation to the main surface. When the value of F1/L1 is larger than 0.8, the angle of the sloping surface in relation to the main surface approaches 90 degrees, and the effect of preventing the abutment against the surface of the sensor element by the sloping surface may reduce.

In the gas sensor of the present invention, two or more metal terminal members may be arranged in the width direction on at least one of opposite surfaces of the sensor element such that the metal terminal members are spaced from one another.

In the case where two or more metal terminal members are arranged in the width direction, a limitation is imposed on the dimensions of the element abutting portion and the electrode pad in the width direction, and the metal terminal member becomes more likely to move out of place in relation to the electrode pad. Therefore, the present invention is more effective.

Effect of the Invention

The present invention provides a gas sensor which can maintain the electrical connection between a metal terminal member and an electrode pad of a sensor element even when the metal terminal member moves out of place in relation to the electrode pad.

BRIEF DESCRIPTION OF THE DRAWINGS

FIGS. 6A and 6B are a pair of process drawings showing assembly of a forward-end-side separator and a rear-end-side separator.

MODES FOR CARRYING OUT THE INVENTION

An embodiment of the present invention will now be described.

Figure 1:
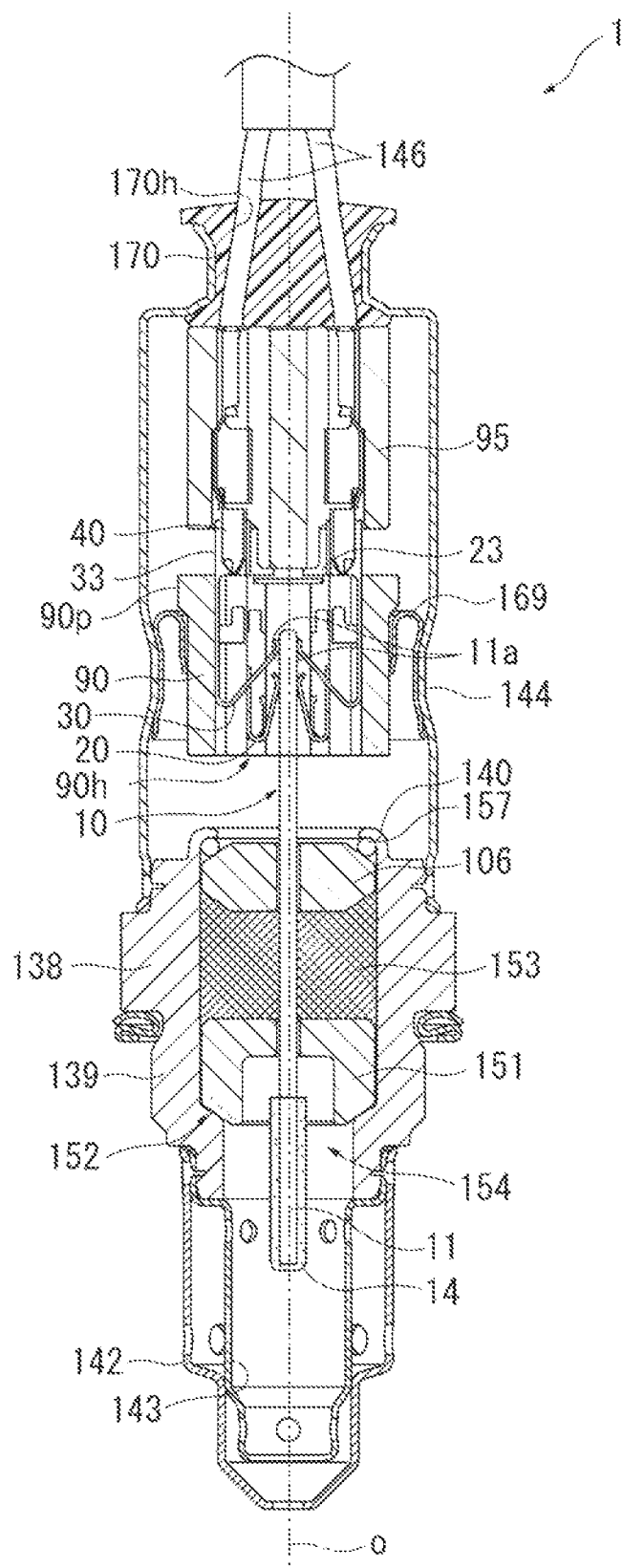
FIG. 1 is a cross-sectional view of a gas sensor according to an embodiment of the present invention, taken along an axial line.
Figure 2:
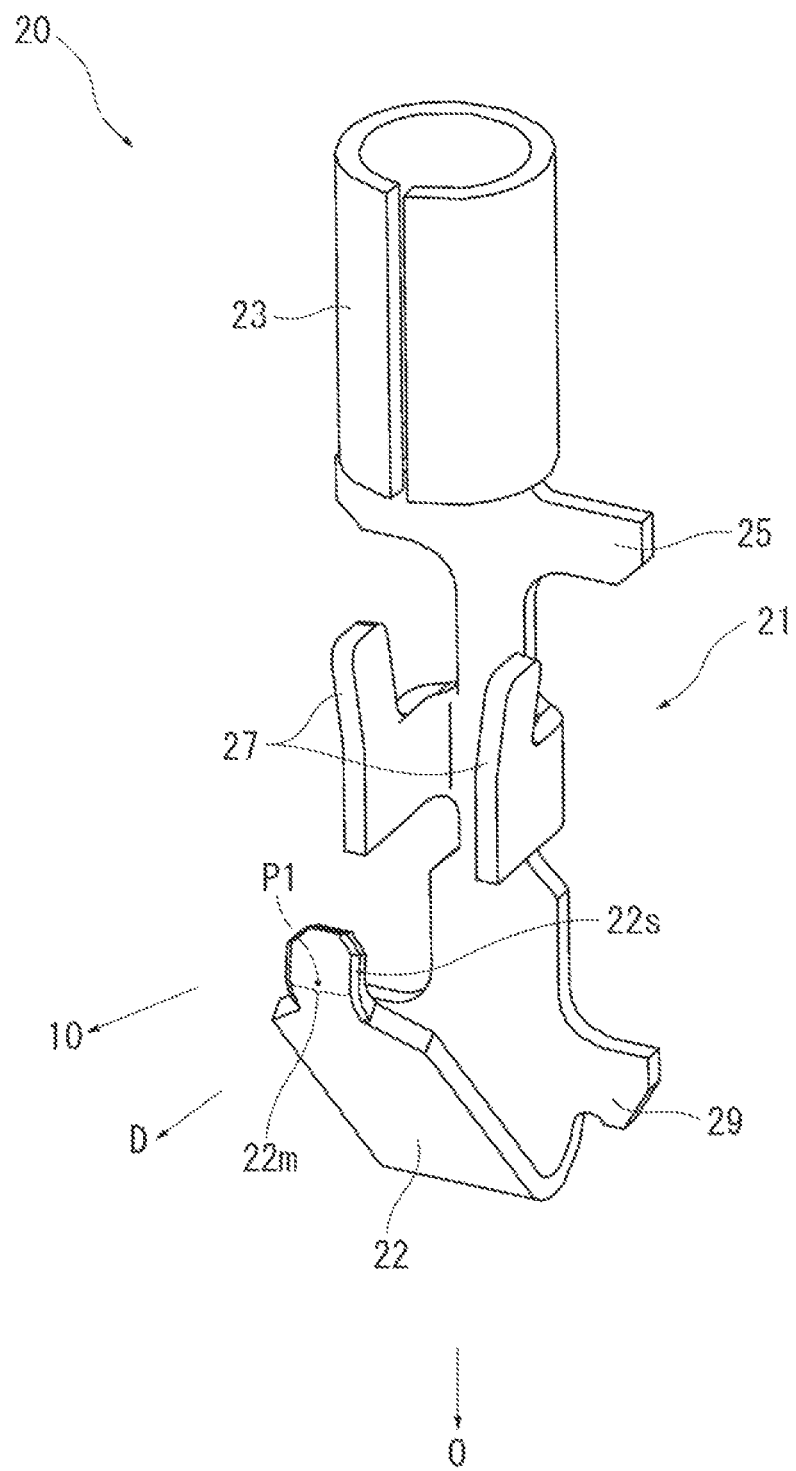
FIG. 2 is a perspective view of a forward-end-side metal terminal member.
Figure 3:
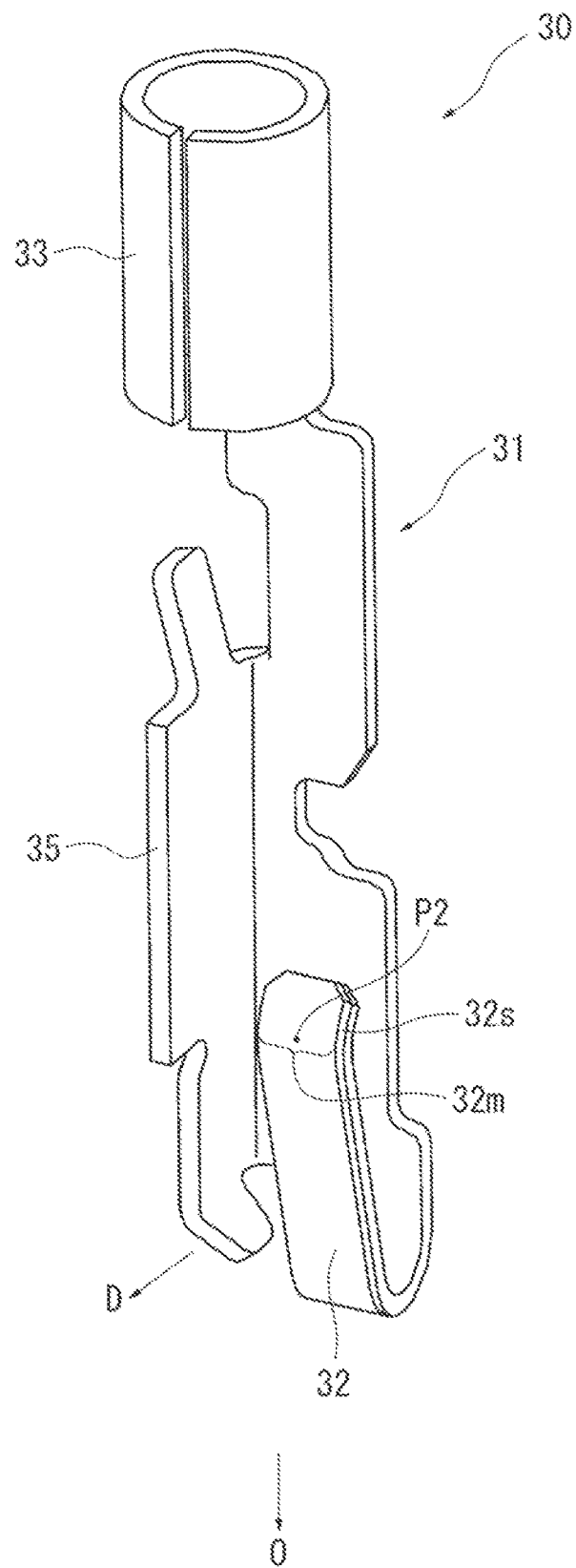
FIG. 3 is a perspective view of another forward-end-side metal terminal member.
Figure 4:
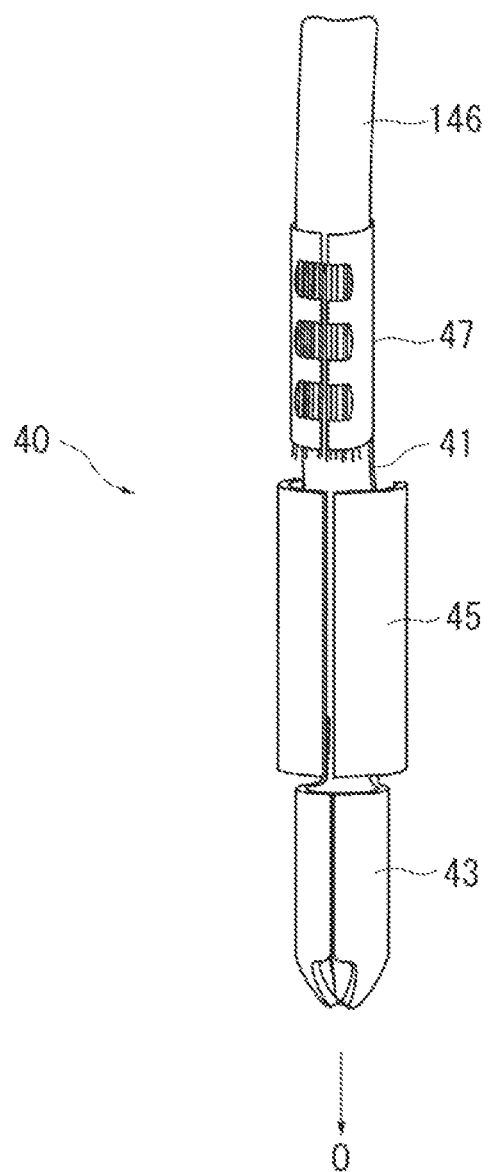
FIG. 4 is a perspective view of a rear-end-side metal terminal member.
Figure 5:
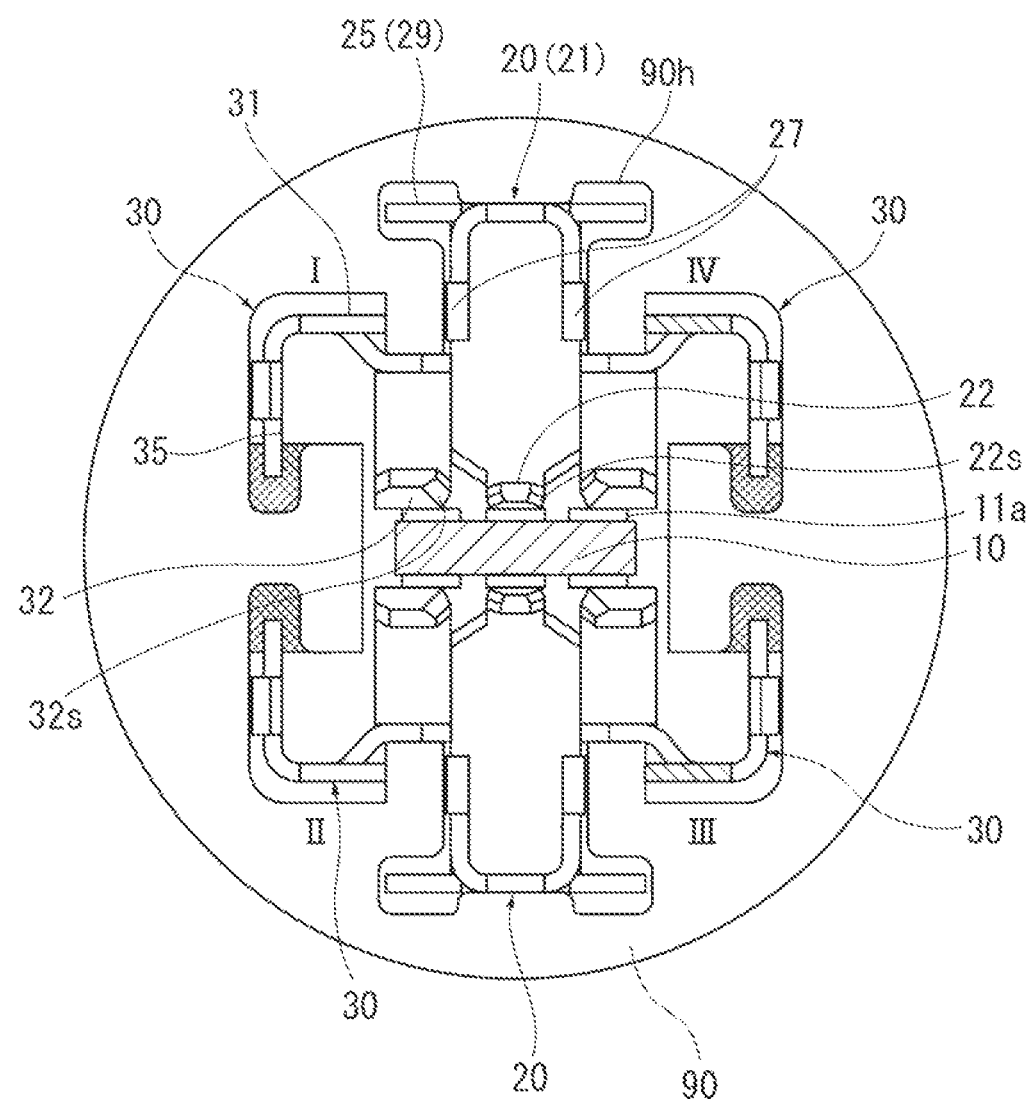
FIG. 5 is a cross-sectional view showing a state in which forward-end-side metal terminal members are held by a forward-end-side separator.

FIG. 1 is an overall cross-sectional view of a gas sensor (NOx sensor) 1 according to an embodiment of the present invention, taken along an axial line O. FIGS. 2 and 3 are perspective views of forward-end-side metal terminal members 20 and 30. FIG. 4 is a perspective view of a rear-end-side metal terminal member 40. FIG. 5 is a cross-sectional view showing a state in which the forward-end-side metal terminal members 20 and 30 are held by a forward-end-side separator 90. FIGS. 6A and 6B are a pair of process drawings showing assembly of the forward-end-side separator 90 and a rear-end-side separator 95, as viewed from a predetermined cross section of the forward-end-side separator 90 and a predetermined cross section of the rear-end-side separator 95.

The gas sensor 1 is an NOx sensor for detecting the concentration of oxygen in exhaust gas from automobiles and various internal combustion engines.

In FIG. 1, the gas sensor 1 includes a tubular metallic shell 138 having a threaded portion 139 formed on its outer surface and adapted for fixation to an exhaust pipe; a plate-shaped sensor element 10 extending in the direction of the axial line O (the longitudinal direction of the gas sensor 1, or the vertical direction in the drawing); a tubular ceramic sleeve 106 disposed so as to surround the radial circumference of the sensor element 10; the tubular forward-end-side separator 90 formed of ceramic and disposed so as to surround the circumference of a rear end portion of the sensor element 10 inserted into a forward-end-side internal space of the forward-end-side separator 90; the six forward-end-side metal terminal members 20 and 30 (only four of them are illustrated in FIG. 1) which are inserted into through holes 90h extending through the forward-end-side separator 90 in the direction of the axial line O and are held in the through holes 90h; the tubular rear-end-side separator 95 formed of ceramic; and the six rear-end-side metal terminal members 40 (only two of them are illustrated in FIG. 1) held in the rear-end-side separator 95.

As will be described later, the rear-end-side separator 95 is disposed on the rear end side of the forward-end-side separator 90 to be in contact with the forward-end-side separator 90, and the rear-end-side separator 95 and the forward-end-side separator 90 are connected to each other.

The forward-end-side metal terminal members 20 and 30 are disposed on the forward end side, and the rear-end-side metal terminal members 40 are disposed on the rear end side. The forward-end-side metal terminal members 20 and 30 are connected to the respective rear-end-side metal terminal members 40. The forward-end-side metal terminal members 20 and 30 correspond to the "metal terminal member" in the claims.

Notably, as shown in FIG. 5, the forward-end-side metal terminal members 20 and 30 held in the through holes 90*h* of the forward-end-side separator 90 face the outer surface of the sensor element 10 at the rear end side thereof and are electrically connected to electrode pads 11*a* formed on the outer surface.

The electrode pads 11*a* are formed in such a manner that three electrode pads 11*a* are provided on each of the opposite surfaces of the sensor element 10 at the rear end side and are arranged in its width direction. The electrode pads 11*a* may be formed of, for example, a sintered body composed mainly of Pt.

Meanwhile, a gas detection portion 11 at the forward end of the sensor element 10 is covered with a porous protection layer 14 formed of, for example, alumina.

The metallic shell 138 is an approximately tubular member formed of stainless steel and having a through hole 154 extending therethrough in the direction of the axial line and a ledge portion 152 protruding toward a radially inward region of the through hole 154. The sensor element 10 is disposed in the through hole 154 such that a forward end portion of the sensor element 10 protrudes from the forward end of the through hole 154. The ledge portion 152 has an inward tapered surface inclined with respect to a plane perpendicular to the direction of the axial line.

Within the through hole 154 of the metallic shell 138, an approximately annular ceramic holder 151 formed of alumina, a powder-charged layer 153 (hereinafter may be referred to as a talc ring 153), and the above-described ceramic sleeve 106 are stacked in this order from the forward end side to the rear end side so as to surround the radial circumference of the sensor element 10.

A crimp packing 157 is disposed between the ceramic sleeve 106 and a rear end portion 140 of the metallic shell 138. The rear end portion 140 of the metallic shell 138 is crimped so as to press the ceramic sleeve 106 forward through the crimp packing 157.

As shown in FIG. 1, a dual protector formed of metal (e.g., stainless steel) is attached by, for example, welding to the outer circumference of a forward end portion (a lower portion in FIG. 1) of the metallic shell 138 and covers a protruding portion of the sensor element 10. The dual protector has a plurality of holes and is composed of an outer protector 142 and an inner protector 143.

An outer casing 144 is fixed to the outer circumference of a rear end portion of the metallic shell 138. Lead wires 146 are connected to rear end portions of the respective rear-end-side metal terminal members 40 and extend toward the rear end side of the rear-end-side separator 95.

A grommet 170 formed of rubber is disposed in an opening portion of the outer casing 144 located on the rear end side (the upper side in FIG. 1) and has lead wire insertion holes 170*h* into which six lead wires 146 (only two of them are illustrated in FIG. 1) extending from the rear-end-side separator 95 are inserted.

The forward-end-side separator 90 is disposed on the rear end side (the upper side in FIG. 1) of the sensor element 10 protruding from the rear end portion 140 of the metallic shell 138 and has a collar portion 90*p* protruding radially outward from the outer surface of the forward-end-side separator 90. The collar portion 90*p* abuts against the outer casing 144 through a holding member 169, and the forward-end-side separator 90 is thereby held within the outer casing 144.

The rear-end-side separator 95 is disposed between the grommet 170 and the forward-end-side separator 90, and elastic force of the grommet 170 causes the rear-end-side separator 95 to press the forward-end-side separator 90 toward the forward end side. As a result, the collar portion 90*p* is pressed against the holding member 169, and the forward-end-side separator 90 and the rear-end-side separator 95 are thereby held within the outer casing 144 in a mutually connected condition (i.e., without separation in the direction of the axial line O).

FIGS. 2 and 3 show the perspective views of the forward-end-side metal terminal members 20 and 30, respectively. In the present embodiment, two types of forward-end-side metal terminal members; i.e., the forward-end-side metal terminal members 20 and the forward-end-side metal terminal members 30, are used.

Notably, as shown in FIG. 5, the four forward-end-side metal terminal members 30 are configured such that the shapes of the forward-end-side metal terminal members 30 located adjacent to each other within the forward-end-side separator 90 are line-symmetrical with each other.

Therefore, of the forward-end-side metal terminal members 30, one forward-end-side metal terminal member 30 (located at an upper left position I in FIG. 5) will be described.

The forward-end-side metal terminal member 30 located at a lower left position II in FIG. 5 is line-symmetrical with the forward-end-side metal terminal member 30 located at the position I with respect to a line (axis of symmetry) extending along the planar direction of the sensor element 10. The forward-end-side metal terminal member 30 located at a lower right position III in FIG. 5 is line-symmetrical with the forward-end-side metal terminal member 30 located at the position II with respect to a line (axis of symmetry) orthogonal to the planar direction of the sensor element 10. The forward-end-side metal terminal member 30 located at an upper right position IV in FIG. 5 is line-symmetrical with the forward-end-side metal terminal member 30 located at the position I with respect to the line (axis of symmetry) orthogonal to the planar direction of the sensor element 10.

The shapes of the two forward-end-side metal terminal members 20 facing each other within the forward-end-side separator 90 are line-symmetrical with each other. Therefore, one forward-end-side metal terminal member 20 (located on the upper side of FIG. 5) will be described.

The forward-end-side metal terminal member 20 located on the lower side of FIG. 5 is line-symmetrical with the upper side forward-end-side metal terminal member 20 with respect to the line extending along the planar direction of the sensor element 10. Notably, each of the forward-end-side metal terminal member 20 is located between two forward-end-side metal terminal members 30 in the width direction of the sensor element 10.

As shown in FIG. 2, each forward-end-side metal terminal member 20 as a whole extends in the direction of the axial line O and integrally includes a connection portion 23 to be connected to a corresponding rear-end-side metal terminal member 40, a body portion 21 having an approximately plate like shape and connected to a forward end portion of the connection portion 23, and an element abutting portion 22 bent toward the sensor element 10 at the forward end of the body portion 21.

Each of the forward-end-side metal terminal members 20 can be manufactured, for example, by punching a blank from a single metal sheet (Inconel (registered trademark) or the like) and bending the punched blank into a predetermined shape. However, the process of manufacturing the forward-end-side metal terminal members 20 is not limited to the above-described process.

The connection portion 23 has a cylindrical tubular shape and a C-shaped cross section. The rear-end-side metal terminal member 40 whose forward end has a cylindrical tubular shape and a C-shaped cross section is fitted into the tubular connection portion 23, whereby the rear-end-side metal terminal member 40 is connected to the connection portion 23. In this case, the forward-end-side metal terminal member 20 is connected to the lead wire 146 indirectly via the rear-end-side metal terminal member 40.

The body portion 21 has a central portion in the direction of the axial line O, and outer end portions of the central portion on opposite sides in the width direction are bent at 90 degrees toward the sensor element 10, whereby a holding portion 27 having a squarish-C-shaped cross section is formed. The connection portion 23 is integrally connected to the rear end of the body portion 21. The body portion 21 serves as a base portion of the forward-end-side metal terminal member 20, thereby securing the strength of the forward-end-side metal terminal member 20.

Meanwhile, the body portion 21 has a rear end portion in the direction of the axial line O, and a pair of rear-end-side holding portions 25 which have a rectangular lug-like shape and are flush with the body portion 21 extend outward from the opposite sides of the rear end portion in the width direction. Similarly, the body portion 21 has a forward end portion in the direction of the axial line O, and a pair of forward-end-side holding portions 29 which have a rectangular lug-like shape and are flush with the body portion 21 extend outward from the opposite sides of the forward end portion in the width direction.

The element abutting portion 22 extends from the forward end of the body portion 21, and is bent toward the sensor element 10 and toward the rear end side. The element abutting portion 22 is elastically connected to the corresponding electrode pad 11a (see FIGS. 1 and 5) at a contact point P1. Notably, the element abutting portion 22 elastically deflects in the radial direction in relation to the body portion 21, whereby a pressing force D is produced.

As will be described in detail later, the element abutting portion 22 has a flat main surface 22m and a sloping surface 22s. The main surface 22m includes the contact point P1, faces the sensor element 10, and abuts against the electrode pad 11a. The sloping surface 22s is formed on at least one of opposite end portions in the width direction of the forward-end-side metal terminal member 20. The sloping surface 22s is connected to the main surface 22m and extends toward the opposite side in the thickness direction of the element abutting portion 22.

Notably, in FIG. 2, the sloping surface 22s is formed on each of the opposite end portions in the width direction of the forward-end-side metal terminal member 20.

Similarly, as shown in FIG. 3, each forward-end-side metal terminal member 30 as a whole extends in the direction of the axial line O and integrally includes a connection portion 33 to be connected to a corresponding rear-end-side metal terminal member 40, a body portion 31 having an approximately plate like shape and connected to a forward end portion of the connection portion 23, and an element abutting portion 32 bent toward the sensor element 10 at the forward end side of the body portion 31.

Each of the forward-end-side metal terminal members 30 can be manufactured, for example, by punching a blank from a single metal sheet (Inconel (registered trademark) or the like) and bending the punched blank into a predetermined shape. However, the process of manufacturing the forward-end-side metal terminal members 30 is not limited to the above-described process.

The connection portion 33 has a cylindrical tubular shape similar to that of the connection portion 23. As in the case of the connection portion 23, the rear-end-side metal terminal member 40 is fitted into the tubular connection portion 33, whereby the rear-end-side metal terminal member 40 is connected to the connection portion 33.

The body portion 31 has an L-shaped cross section. One widthwise outer portion of the body portion 31 is bent at 90 degrees toward the sensor element 10, whereby a position holding portion 35 is formed. The connection portion 33 is integrally connected to the rear end of the body portion 31. The body portion 31 serves as a base portion of the forward-end-side metal terminal member 30, thereby securing the strength of the forward-end-side metal terminal member 30.

The element abutting portion 32 extends from the forward end of the body portion 31, and is bent toward the sensor element 10 and toward the rear end side. The element abutting portion 22 is elastically connected to the corresponding electrode pad 11a (see FIGS. 1 and 5) at a contact point P2. Notably, the element abutting portion 32 elastically deflects in the radial direction in relation to the body portion 31, whereby a pressing force D is produced.

As will be described in detail later, the element abutting portion 32 has a flat main surface 32m and a sloping surface 32s. The main surface 32m includes the contact point P2, faces the sensor element 10, and abuts against the electrode pad 11a. The sloping surface 32s is formed on at least one of opposite end portions in the width direction of the forward-end-side metal terminal member 30. The sloping surface 32s is connected to the main surface 32m and extends toward the opposite side in the thickness direction of the element abutting portion 32.

Notably, in FIG. 3, the sloping surface 32s is formed only at one (on the right side in FIG. 3) of the opposite end portions in the width direction of the forward-end-side metal terminal member 30.

Meanwhile, as shown in FIG. 4, each rear-end-side metal terminal member 40 as a whole extends in the direction of the axial line O and integrally includes a crimp terminal portion 47, a neck portion 41, a cylindrical tubular large-diameter portion 45, and a cylindrical tubular forward end portion 43. The crimp terminal portion 47 is connected to a corresponding lead wire 146. The neck portion 41 has an approximately plate-like shape and is connected to the forward end of the crimp terminal portion 47. The large-diameter portion 45 is connected to the forward end of the neck portion 41. The large-diameter portion 45 is formed by bending a plate-like portion to have a C-shaped cross section. The forward end portion 43 is connected to the forward end of the large-diameter portion 45. The forward end portion 43 is formed by bending a plate-like portion to have a C-shaped cross section.

Each rear-end-side metal terminal member 40 can be manufactured, for example, by punching a blank from a single metal sheet (SUS304 or the like) and bending the punched blank into a predetermined shape. However, the process of manufacturing each rear-end-side metal terminal member 40 is not limited to the above-described process.

The forward end portion 43 has a cylindrical tubular shape and a tapered forward end. The forward end portion 43 is fitted into the tubular connection portion 23 or 33, whereby the rear-end-side metal terminal member 40 is electrically connected to the forward-end-side metal terminal member 20 or 30.

The large-diameter portion 45 is larger in diameter than the crimp terminal portion 47 and the forward end portion 43, and a rearward-facing surface 45e of the large-diameter portion 45 is located on the radially outer side of the crimp terminal portion 47.

The forward-end-side metal terminal members 20 and 30 are incorporated into the forward-end-side separator 90 as shown in FIG. 5. When a forward-end-side metal terminal member 20 is inserted into a corresponding insertion hole 90h from the rear end side as shown in FIG. 6A, the forward-end-side holding portion 29 of the forward-end-side metal terminal member 20 abuts against a rearward-facing surface 90s of the forward-end-side separator 90, whereby coming off of the forward-end-side metal terminal member 20 toward the forward end side is prevented, and the forward-end-side metal terminal member 20 is held within the forward-end-side separator 90.

Similarly, although not shown in the drawings, when a forward-end-side metal terminal member 30 is inserted into a corresponding insertion hole 90h from the rear end side, the forward end of the position holding portion 35 of the forward-end-side metal terminal member 30 abuts against a predetermined rearward-facing surface of the forward-end-side separator 90, whereby coming off of the forward-end-side metal terminal member 30 toward the forward end side is prevented, and the forward-end-side metal terminal member 30 is held within the forward-end-side separator 90.

Notably, in a state in which the forward-end-side metal terminal members 20 and 30 are held within the forward-end-side separator 90, the connection portions 23 and 33 protrude toward the rear end side of the forward-end-side separator 90.

Meanwhile, as shown in FIG. 6A, the rear-end-side separator 95 has six insertion holes 95h arranged circumferentially (only two of them are illustrated in FIGS. 6A and 6B). Each insertion hole 95h has a large diameter at its forward end side and decreases in diameter at a step portion in the vicinity of the center in the direction of the axial line O, and the step portion forms a forward-facing surface 95s.

Each lead wire 146 is inserted in advance into a corresponding insertion hole 95h so as to protrude forward therefrom, and the lead wire 146 is connected to a corresponding rear-end-side metal terminal member 40 on the forward end side of the rear-end-side separator 95. Next, part of the rear-end-side metal terminal member 40 on the lead wire 146 side is inserted into the insertion hole 95h from the forward end side, and the lead wire 146 is pulled rearward. As a result, the rearward-facing surface 45e (see FIG. 4) of the large diameter portion 45 of the rear-end-side metal terminal member 40 abuts against the forward-facing surface 95s, whereby the coming off of the rear-end-side metal terminal member 40 toward the rear end side is prevented, and the rear-end-side metal terminal member 40 is held within the rear-end-side separator 95.

At that time, a forward end part of the forward end portion 43 of the rear-end-side metal terminal member 40 (the forward end part is located on the forward end side of the center of the forward end portion 43 in the direction of the axial line O) protrudes from the forward-facing surface of the rear-end-side separator 95.

The outer diameter of the large diameter portion 45 is slightly smaller than the inner diameter of the insertion hole 95h. The large diameter portion 45 comes into engagement with the corresponding insertion hole 95h, so that the rear-end-side metal terminal member 40 is held within the rear-end-side separator 95.

Recesses 90r extending along the width direction of the sensor element are formed on the rearward-facing surface of the forward-end-side separator 90. Also, two protrusions 95p extending along the width direction of the sensor element are formed at the outer periphery of the forward-facing surface of the rear-end-side separator 95.

Accordingly, as shown in FIG. 6B, when the recesses 90r are engaged with the protrusions 95p after incorporation of the forward-end-side metal terminal members 20 and 30 into the forward-end-side separator 90 and incorporation of the rear-end-side metal terminal members 40 into the rear-end-side separator 95, the forward-end-side separator 90 and ther ear-end-side separator 95 are connected to each other.

At that time, the forward end portions 43 of the rear-end-side metal terminal members 40 projecting toward the forward end side of the rear-end-side separator 95 are fitted into the connection portions 23 of the forward-end-side metal terminal members 20 protruding toward the rear end side of the forward-end-side separator 90, whereby the rear-end-side metal terminal members 40 are connected to the forward-end-side metal terminal members 20.

Notably, in FIGS. 6A and 6B, in order to facilitate understanding, one of metal terminal members (the forward-end-side metal terminal members 20 and 30 and the rear-end-side metal terminal members 40) which face each other in each separator (each of the forward-end-side separator 90 and the rear-end-side separator 95) is omitted.

Figure 7:
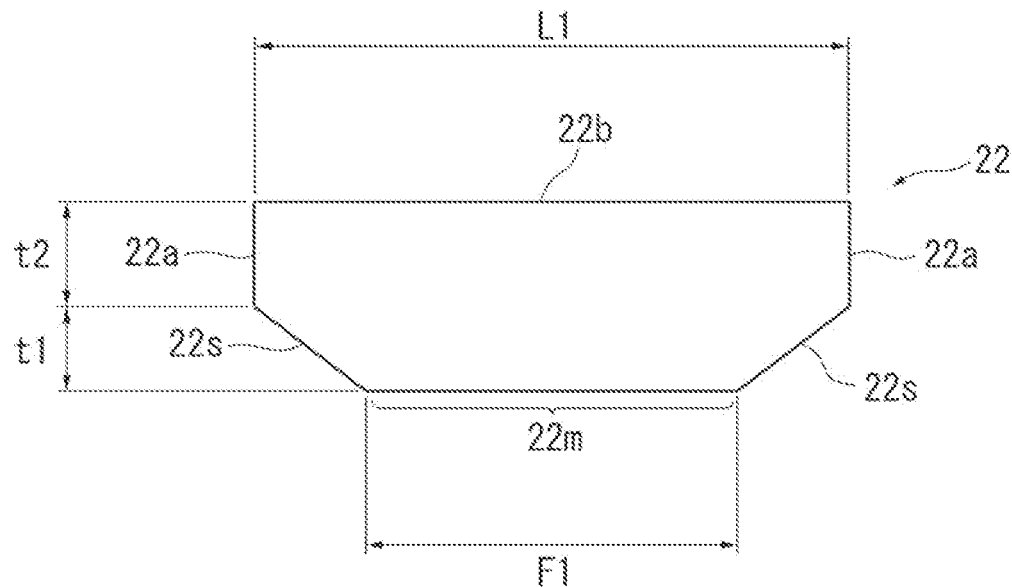
FIG. 7 is a cross-sectional view of an element abutting portion of a forward-end-side metal terminal member located at the center in a width direction.
Figure 8:
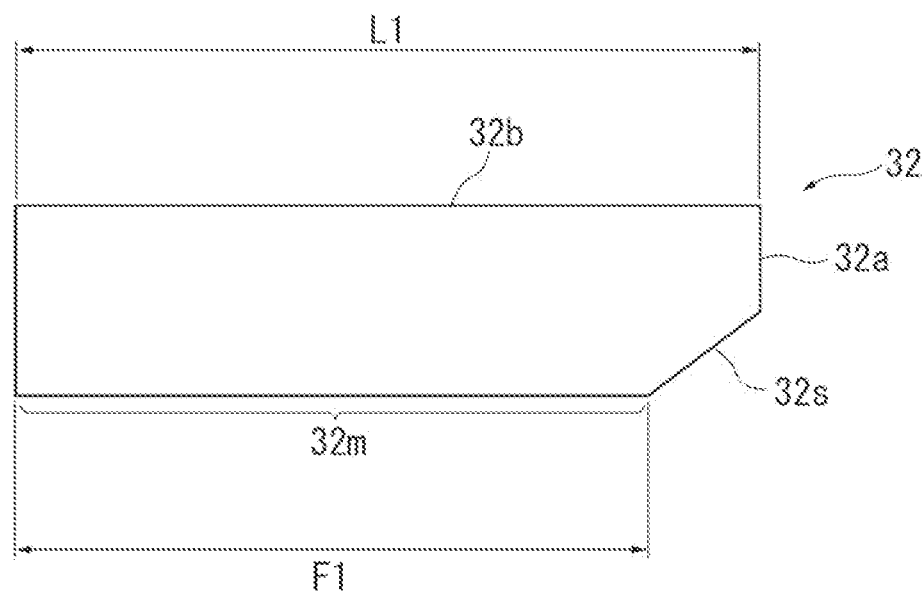
FIG. 8 is a cross-sectional view of an element abutting portion of a forward-end-side metal terminal member located at an end portion in the width direction.
Figure 9A:
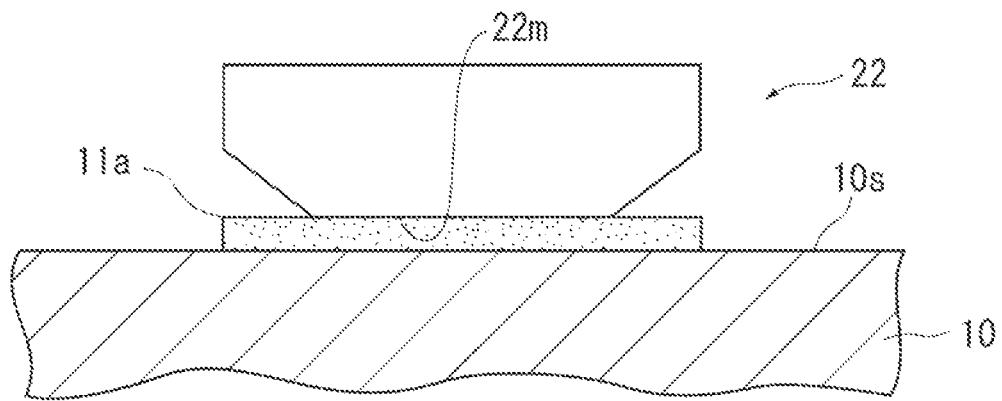
FIGS. 9A and 9B are a pair of views representing the positional relation between the element abutting portion of FIG. 7 and an electrode pad in the case where the element abutting portion has moved out of place while inclining.
Figure 9B:
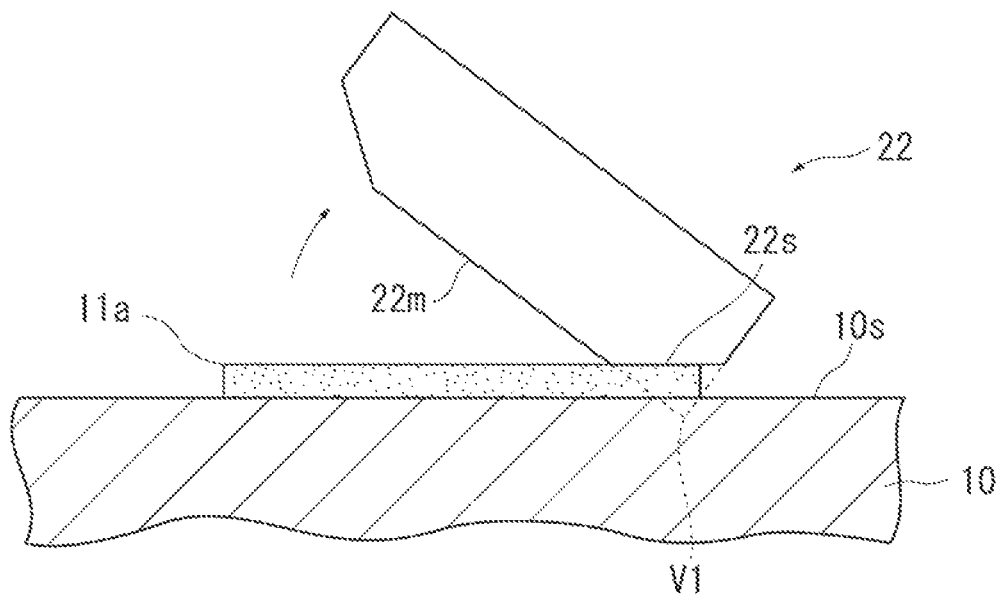
Figure 10A:
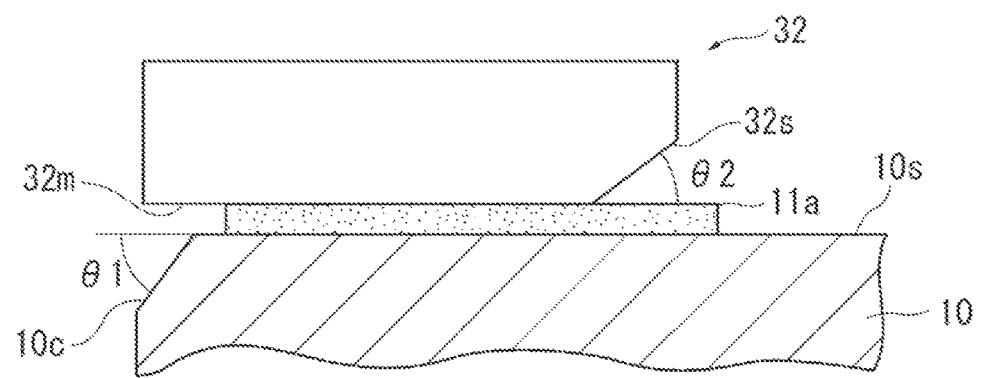
FIGS. 10A and 10B are a pair of views representing the positional relation between the element abutting portion of FIG. 8 and an electrode pad at an end portion of a sensor element in the case where the element abutting portion has moved out of place in the width direction.
Figure 10B:
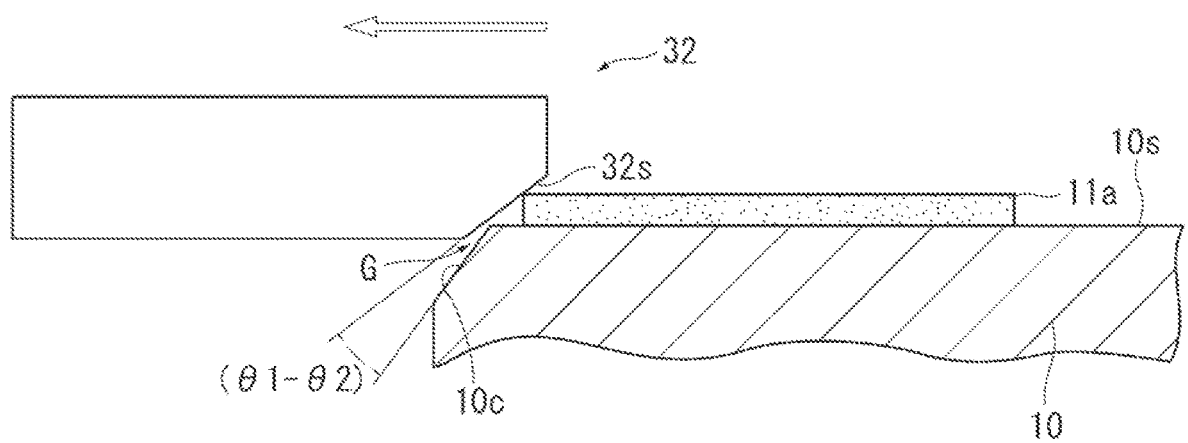
Figure 11A:
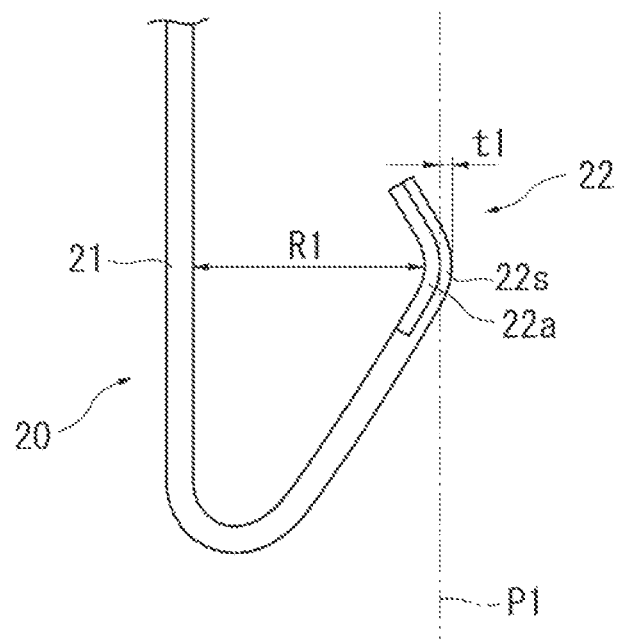
FIGS. 11A and 11B are a pair of views representing the amount of deflection of the element abutting portion in the case where a sloping surface of the element abutting portion shown in FIG. 7 has abutted against an electrode pad.
Figure 11B:
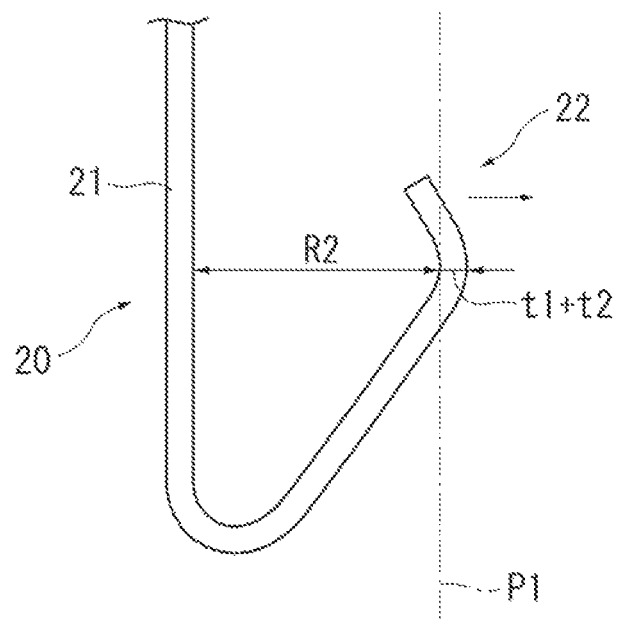

Next, the feature of the present invention will be described with reference to FIGS. 7 to 11. FIG. 7 is a cross-sectional view of the element abutting portion 22 of the forward-end-side metal terminal member 20 located at the center in the width direction. FIG. 8 is a cross-sectional view of the element abutting portion 32 of the forward-end-side metal terminal member 30 located at an end portion in the width direction. FIGS. 9A and 9B are a pair of views representing the positional relation between the element abutting portion 22 and the corresponding electrode pad 11a in the case where the element abutting portion 22 has moved out of place while inclining. FIGS. 10A and 10B are a pair of views representing the positional relation between the element abutting portion 32 and the corresponding electrode pad 11a at an end portion of the sensor element 10 in the case where the element abutting portion 32 has moved out of place in the width direction. FIGS. 11A and 11B are a pair of views representing the amount of deflection of the element abutting portion 22 in the case where a sloping surface 22s of the element abutting portion 22 has abutted against the corresponding electrode pad 11a.

Notably, FIGS. 7 and 8 are the respective cross-sectional views of the element abutting portions 22 and 32, taken along the width direction.

As shown in FIG. 7, the element abutting portion 22 has the above-described main surface 22m and two sloping surfaces 22s. In the present embodiment, the element abutting portion 22 has side surfaces 22a connected to the sloping surfaces 22s and facing outward in the width direction, and an opposite surface 22b located on the side opposite the main surface 22m and the sloping surfaces 22s in the thickness direction is flat.

Notably, the opposite surface 22b of the element abutting portion 22 can be made flat, for example, by forming the sloping surfaces 22s, through sheet metal press working, from a flat plate portion which is to become the element abutting portion 22, during manufacture of the forward-end-side metal terminal member 20.

In this case, as a result of work hardening, the hardness of the sloping surfaces 22s becomes greater than the hardness of the main surface 22m. Hardness can be measured by a micro Vickers hardness meter. The unit of hardness used herein is HV; however, other units may be used.

Notably, when the element abutting portion 22 of a forward-end-side metal terminal member 20 incorporated into the gas sensor 1 is observed, a surface containing the contact point P1 may be a central flat surface in the width direction of the forward-end-side metal terminal member 20. In such a case, the surface containing the contact point P1 is the main surface 22m. In the case where the surface containing the contact point P1 is an end portion extending from the flat surface, located at the center in the width direction, toward the opposite side in the thickness direction, the surface containing the contact point P1 is one of the sloping surfaces 22s. The above also applies to the main surface 32m which will be described later.

As shown in FIG. 8, the element abutting portion 32 has the above-described main surface 32m and one sloping surface 32s. Like the element abutting portion 22, the element abutting portion 32 has a side surface 32a connected to the sloping surface 32s and facing outward in the width direction, and an opposite surface 32b located on the side opposite the main surface 32m and the sloping surface 32s in the thickness direction is flat.

Next, the action and effect of the element abutting portion 22 achieved through provision of the sloping surfaces 22s will be described with reference to FIGS. 9A and 9B.

In an ordinary state, the main surface 22m of the element abutting portion 22 is electrically connected to the corresponding electrode pad 11a by means of pressing force (FIG. 9A).

However, for example, because of assembly of the gas sensor 1 or vibration generated when a vehicle including the gas sensor 1 mounted thereon travels, the element abutting portion 22 may move out of place in relation to the electrode pad 11a while inclining (FIG. 9B). In such a case, if the element abutting portion 22 is assumed not to have sloping surfaces (as indicated by a broken line in FIGS. 9A and 9B), its corner portion V1 abuts against an outer surface 10s of the sensor element 10, the outer surface 10s being located adjacent to the electrode pad 11a, so that the element abutting portion 22 disengages from the electrode pad 11a and becomes unable to maintain the contact point.

In order to solve such a problem, the sloping surfaces 22s are provided. As a result, even when the element abutting portion 22 inclines, the element abutting portion 22 is less likely to abut against the outer surface 10s of the sensor element 10, and the element abutting portion 22 is prevented from disengaging from the electrode pad 11a and failing to maintain the contact point. Accordingly, even when the forward-end-side metal terminal member 20 inclines in relation to the electrode pad 11a, the electrical connection between the forward-end-side metal terminal member 20 and the electrode pad 11a can be maintained.

Also, even when the element abutting portion 22 inclines, the element abutting portion 22 is less likely to abut against the surface of the sensor element 10. Therefore, the width of the element abutting portion 22 can be increased accordingly. The increased width can prevent the element abutting portion 22 from coming off from an end portion of the sensor element 10 even when the element abutting portion 22 moves out of place in the width direction.

Next, the action and effect of the element abutting portion 32 achieved through provision of the sloping surface 32s will be described with reference to FIGS. 10A and 10B.

Notably, the element abutting portion 32 abuts against the electrode pad 11a at the end portion (left end) of the sensor element 10. Therefore, when the element abutting portion 32 inclines as a result of a counterclockwise twisting thereof, the element abutting portion 32 does not abut against the surface of the sensor element 10, because the sensor element 10 does not have a surface located on the left side of the end portion and against which the element abutting portion 32 can abut. Accordingly, it is unnecessary to provide the sloping surface 32s on the side (the left side in FIGS. 10A and 10B) of the element abutting portion 32 toward the end portion of the sensor element 10.

In an ordinary state, the main surface 32m of the element abutting portion 32 is electrically connected to the corresponding electrode pad 11a by means of pressing force (FIG. 10A).

When the element abutting portion 32 inclines as a result of a clockwise twisting thereof, the sloping surface 32s prevents the element abutting portion 32 from abutting against the outer surface 10s of the sensor element 10, and can maintain the point of contact between the element abutting portion 32 and the electrode pad 11a. This action and effect are the same as those described for the element abutting portion 22 with reference to FIGS. 9A and 9B.

In the present embodiment, the sensor element 10 has a chamfered portion 10c formed at a corner portion thereof in the width direction and an electrode pad 11a located adjacent to the chamfered portion 10c. The chamfering angle of the chamfered portion 10c (the angle of the surface of the chamfered portion 10c in relation to the surface of the electrode pad 11a) is represented by $\theta 1$. In this case, it is preferred that the angle $\theta 2$ of the sloping surface 32s in relation to the main surface 32m satisfies a relation of $\theta 1 > \theta 2$.

Notably, the angle $\theta 1$ is smaller than 90 degrees.

The element abutting portion 32 may move out of place in the width direction so that the element abutting portion 32 moves away from the end portion of the sensor element 10, for example, because of assembly of the gas sensor 1 or vibration generated when the vehicle including the gas sensor 1 mounted thereon travels (FIG. 10B). In such a case, if the angle $\theta 1$ is smaller than the angle $\theta 2$, the sloping surface 32s abuts against the chamfered portion 10c at an end portion of the electrode pad 11a, and the element abutting portion 32 disengages from the electrode pad 11a and becomes unable to maintain the contact point.

In order to solve such a problem, the angle $\theta 1$ is made larger than the angle $\theta 2$. In this case, since a gap G having a size corresponding to the angle difference ($\theta 1 - \theta 2$) is formed between the sloping surface 32s and the chamfered portion 10c, it is possible to prevent occurrence of a state in which the sloping surface 32s abuts against the chamfered portion 10c, and the element abutting portion 32 disengages from the electrode pad 11a and becomes unable to maintain the contact point.

Figure 21:
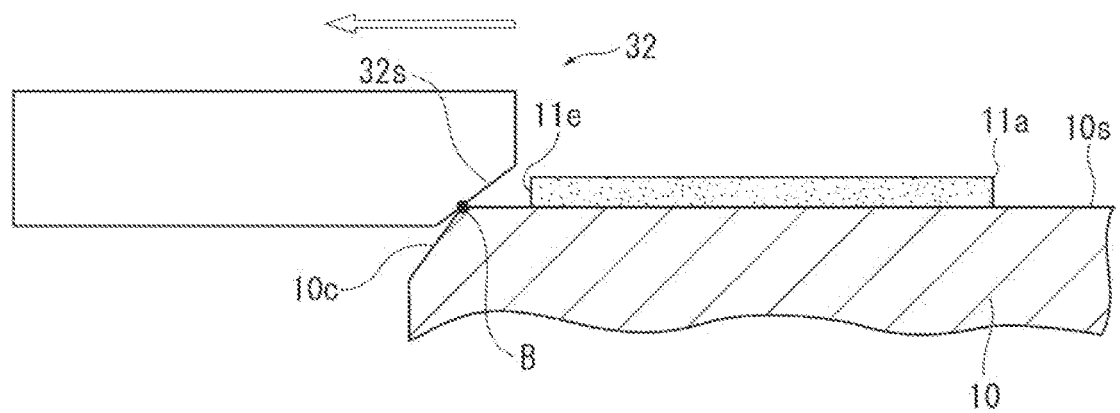
FIG. 21 is a view showing a state in which an electrode pad is spaced from a chamfered portion, so that an element abutting portion cannot reach the electrode pad and cannot make a contact point.

However, in the case where, as shown in FIG. 21, the distance between the electrode pad 11a and the chamfered portion 10c is excessively large, even when the angle $\theta 1$ is made larger than the angle $\theta 2$, the element abutting portion 32 does not reach the electrode pad 11a, and the sloping surface 32s comes into contact with a corner portion (a boundary portion B, which will be described later) of the chamfered portion 10c and disengages from the electrode pad 11a. Namely, the electrode pad 11a must be close, to a certain degree, to the chamfered portion 10c.

In view of the above, it is necessary to determine the angle $\theta 1$ and the angle $\theta 2$ to satisfy the relation of $\theta 1 > \theta 2$ and determine the positional relation between the electrode pad 11a and the chamfered portion 10c.

Figure 22:
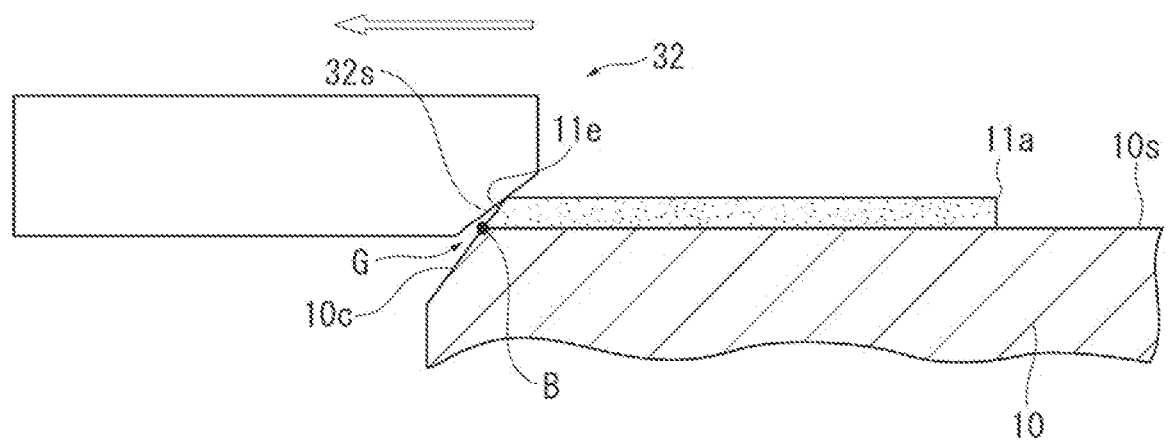
FIG. 22 is a view showing a state in which the electrode pad is in contact with the chamfered portion, so that the element abutting portion has made a contact point on the electrode pad.

(1) First, in the case where an end portion 11e of the electrode pad 11a is in contact with the chamfered portion 10c as shown in FIG. 22, the sloping surface 32s never abuts against the chamfered portion 10c and disengages from the electrode pad 11a, so that the contact point can be maintained.

The expression "the end portion 11e of the electrode pad 11a is in contact with the chamfered portion 10c" means that the end portion 11e of the electrode pad 11a is in contact with the boundary portion (a corner portion of the chamfered portion 10c) B between the chamfered portion 10c and the outer surface 10s of the sensor element 10.

In the example of FIG. 22, after provision of the electrode pad 11a on the sensor element 10 before being chamfered, the end portion 11e of the electrode pad 11a and the chamfered portion 10c are formed simultaneously through cutting or the like, and the angle of the surface of the end portion 11e in relation to the surface of the electrode pad 11a is equal to the chamfering angle $\theta 1$. However, the angle of the surface of the end portion 11e may be an angle (e.g., 90 degrees) different from the chamfering angle $\theta 1$.

Figure 23:
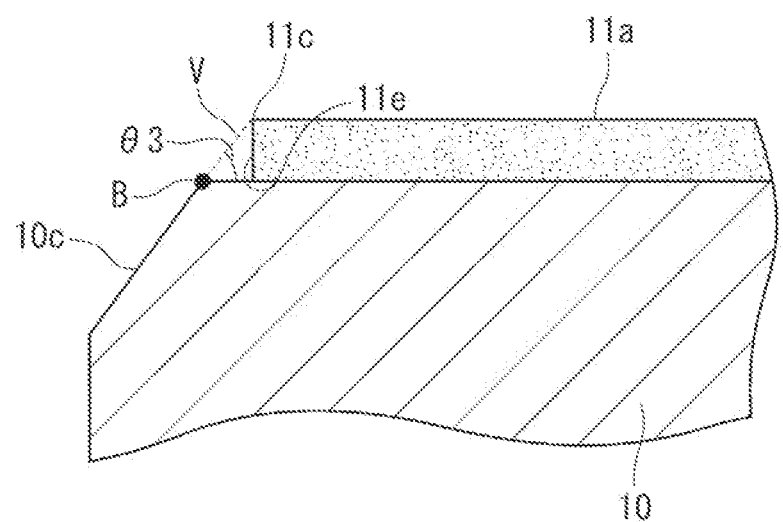
FIG. 23 is a view showing the case where the electrode pad is spaced from the chamfered portion and showing θ3.

(2) Meanwhile, in the case where the end portion 11e of the electrode pad 11a is spaced apart from the chamfered portion 10c (the boundary portion B) as shown in FIG. 23, the following two requirements must be satisfied.

(2-1) First, the angle formed between the outer surface 10s and an imaginary line segment V connecting the boundary portion B and a corner portion 11c (on the element abutting portion 32 side) of the end portion 11e of the electrode pad 11a is represented by $\theta 3$. A relation of $\theta 3 > \theta 2$ must be satisfied because of the following reason.

Figure 24:
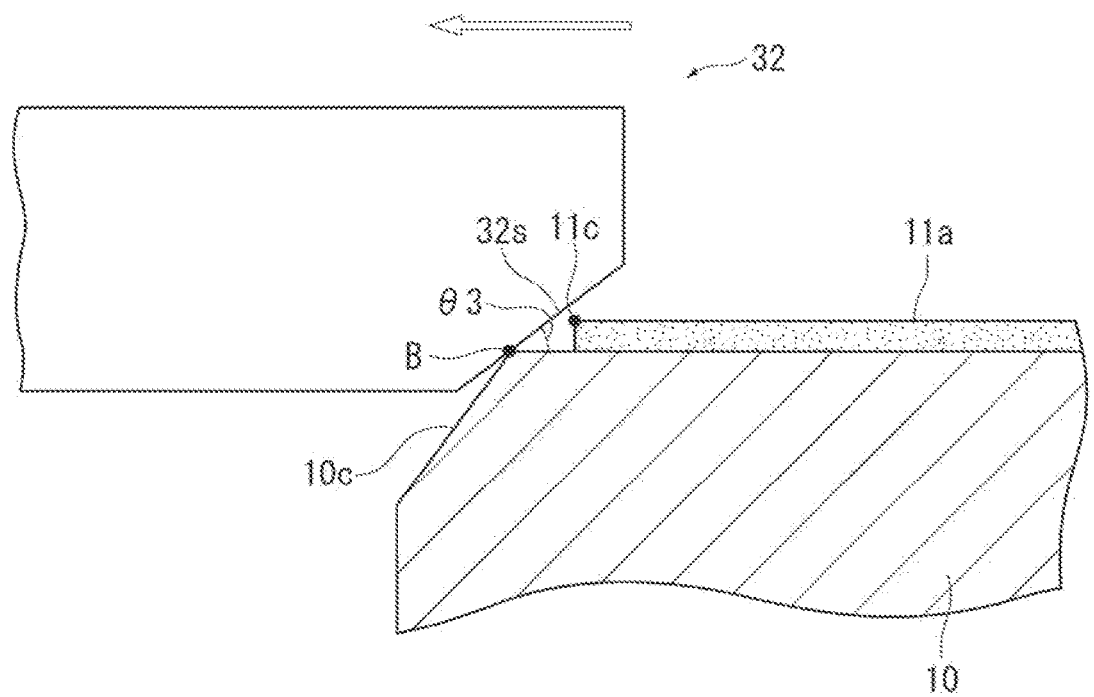
FIG. 24 is a view showing a state in which θ3≤θ2, so that the element abutting portion cannot reach the electrode pad and cannot make a contact point.

In the case where, as shown in FIG. 24, the angle $\theta 3$ becomes smaller than the angle $\theta 2$, for example, as a result of reduction of the thickness of the electrode pad 11a, before the sloping surface 32s comes into contact with the electrode pad 11a, the sloping surface 32s comes into contact with the boundary portion B, so that the sloping surface 32s disengages from the electrode pad 11a and becomes unable to maintain the contact point.

Notably, in the case where the angle $\theta 3$ is equal to the angle $\theta 2$, since the sloping surface 32s comes into contact with the electrode pad 11a and the boundary portion B simultaneously, a contact point is established. However, since the sloping surface 32s is in contact with the boundary portion B, the pressure of contact against the electrode pad 11a is low, and the connection becomes unreliable.

Figure 25:
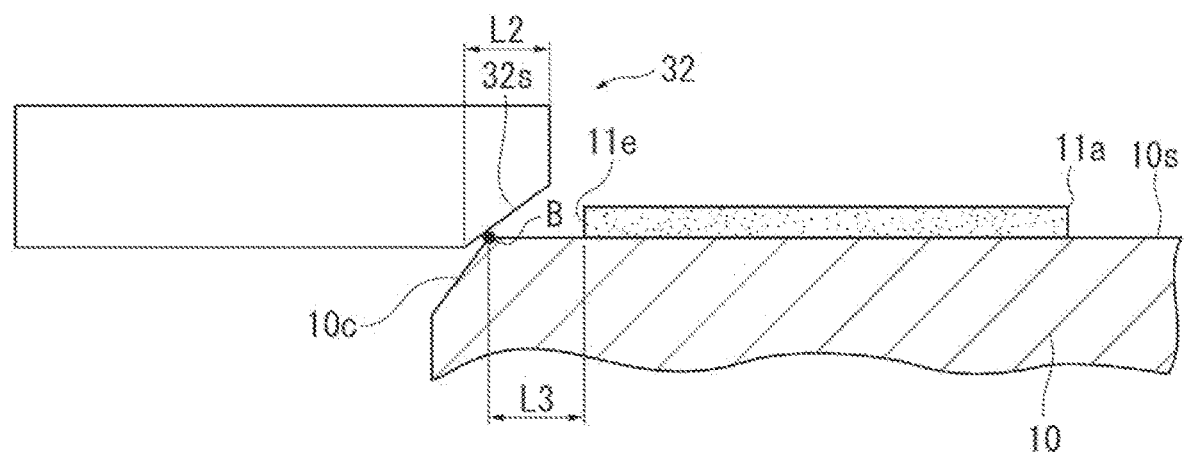
FIG. 25 is a view showing a state in which L3>L2, so that the element abutting portion cannot reach the electrode pad and cannot make a contact point.

(2-2) Next, the distance L3 between the boundary portion B and the end portion 11e of the electrode pad 11a shown in FIG. 25 must be shorter than the length L2 of the sloping surface 32s as measured parallel to the outer surface 10s for the following reason.

In the case where the distance L3 is longer than the distance L2 as shown in FIG. 25, when the sloping surface 32s moves in the width direction across the boundary portion B and comes into contact with the chamfered portion 10c, the element abutting portion 32 (the sloping surface 32s) never reaches the end portion 11e of the electrode pad 11a. Therefore, the element abutting portion 32 cannot maintain the contact point.

The angles $\theta 1$ to $\theta 3$ and the distances L2 and L3 are determined in the manner described above.

Next, the action and effect of the element abutting portion 22 achieved through provision of the side surfaces 22a will be described with reference to FIGS. 11A and 11B.

As shown in FIG. 7, each sloping surface 22s has a thickness t1 and each side surface 22a has a thickness t2 as viewed in the thickness direction of the element abutting portion 22. In the present embodiment, the thickness t1 and the thickness t2 satisfy a relation of t1<t2.

As shown in FIG. 11A, in the case where the element abutting portion 22 has the side surfaces 22a, the contact point P1 between one sloping surface 22s and the electrode pad 11a is located at the terminal end of the sloping surface 22s (the boundary between the sloping surface 22s and the corresponding side surface 22a) even in the case where the contact point P1 is located closest to the body portion 21 of the forward-end-side metal terminal member 20. The amount of deflection of the element abutting portion 22 (the distance from the body portion 21) at that time is represented by R1.

Meanwhile, as shown in FIG. 11B, in the case where the element abutting portion 22 does not have the side surfaces 22a, the sloping surfaces 22s are formed to extend to the opposite side of the element abutting portion 22 in the thickness direction thereof (t1+t2). Therefore, the contact point P1 between one sloping surface 22s and the electrode pad 11a reaches the opposite side of the main surface in the thickness direction of the element abutting portion 22 in the case where the contact point P1 is located closest to the body portion 21 of the forward-end-side metal terminal member 20. The amount of deflection of the element abutting portion 22 at that time is represented by R2. The deflection amount R2 is larger than the deflection amount R1 by an amount corresponding to the thickness t2.

Namely, in the case where the side surfaces 22a are not provided, the amount of deflection of the element abutting portion 22 from the body portion 21 increases, and the element abutting portion 22 expands more from the body portion 21. As a result, the spring force of the element abutting portion 22 decreases, and the contact point pressure tends to decrease.

Accordingly, as a result of provision of the side surfaces 22a on the element abutting portion 22, it is possible to prevent the decrease in the spring force of the element abutting portion 22 and the decrease in the contact point pressure, thereby improving connection reliability.

In particular, in the case where the relation of t1<t2 is satisfied, the decrease in the spring force of the element abutting portion 22 and the decrease in the contact point pressure can be prevented further.

Figure 14:
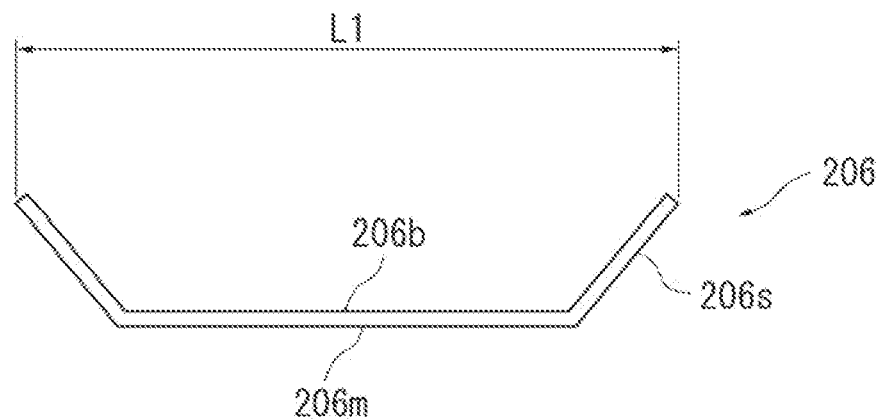
FIG. 14 is a view showing still another modification of the element abutting portion.
Figure 15:
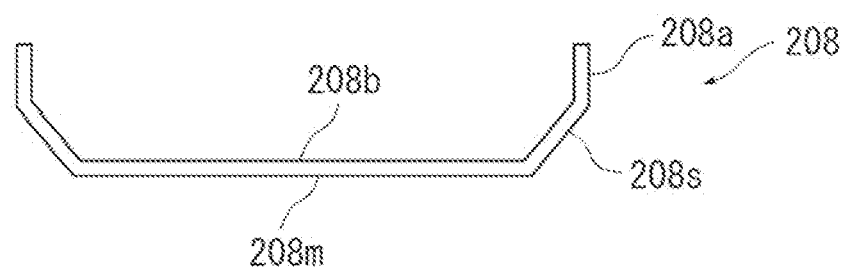
FIG. 15 is a view showing still another modification of the element abutting portion.

As shown in FIG. 7, in the present embodiment, the opposite surface 22b of each element abutting portion 22 is flat. Such a flat surface is obtained, for example, as a result of formation of the sloping surfaces 22s by forging, and the main surface 22m and the sloping surfaces 22s have larger thicknesses as compared with the case where the sloping surfaces are formed by press working as shown in FIGS. 14 and 15, which will be described later.

As a result, spring back of the main surface 22m and the sloping surfaces 22s is prevented, and the accurate shapes of the sloping surfaces 22s can be maintained.

This is also true for the element abutting portion 32.

Also, as shown in FIG. 7, in the present embodiment, the entire length L1 of the forward-end-side metal terminal member 20 in the width direction and the length F1 of the main surface 22m in the width direction satisfy a relation of F1/L1≤0.8. Therefore, each of the sloping surfaces 22s can be formed to have a proper angle in relation to the main surface 22m.

When the value of F1/L1 is larger than 0.8, the angle of each sloping surface 22s in relation to the main surface 22m approaches 90 degrees, and the effect of preventing the abutment against the outer surface 10s of the sensor element 10 by the sloping surfaces 32s may reduce.

Needless to say, the present invention is not limited to the embodiment described above and encompasses various modifications and equivalents within the spirit and scope of the present invention.

The shapes of the element abutting portions are not limited to those employed in the above-described embodiment.

Figure 12:
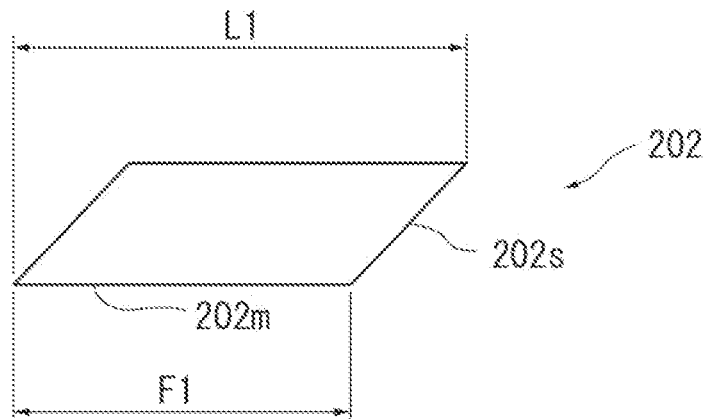
FIG. 12 is a view showing a modification of the element abutting portion.

For example, an element abutting portion 202 shown in FIG. 12 may be employed. The cross section of the element abutting portion 202 in the width direction is a parallelogram. In this case, a sloping surface 202s is connected only to one end of a main surface 202m, and the entire length L1 is the maximum length of the element abutting portion 202 in the width direction.

Figure 13:
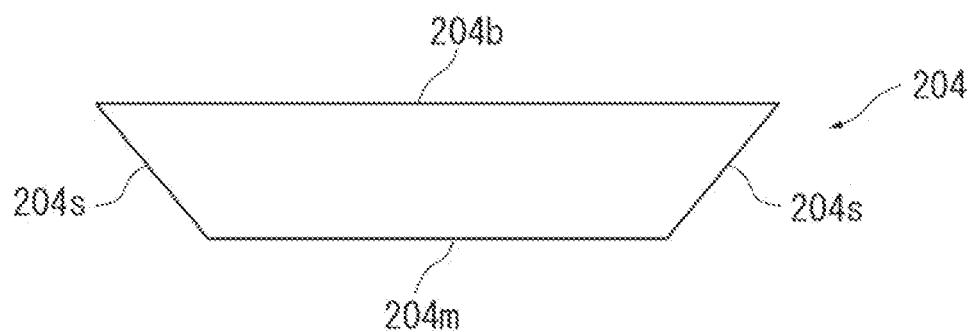
FIG. 13 is a view showing another modification of the element abutting portion.

Also, an element abutting portion 204 shown in FIG. 13 may be employed. The element abutting portion 204 has no side surface. Notably, the element abutting portion 204 has a main surface 204m, and two sloping surfaces 204s connected to opposite ends of the main surface 204m, respectively. The element abutting portion 204 has an opposite surface 204b which is located on the side opposite the main surface 204m and the sloping surfaces 204s in the thickness direction and is flat.

Also, element abutting portions 206 and 208 shown in FIGS. 14 and 15, respectively, may be employed. The element abutting portions 206 and 208 are formed, for example, by press working and have non-flat opposite surfaces 206b and 208b, respectively. Notably, the element abutting portion 206 shown in FIG. 14 has no side surface, and the element abutting portion 208 shown in FIG. 15 has side surfaces 208a.

Figure 16:
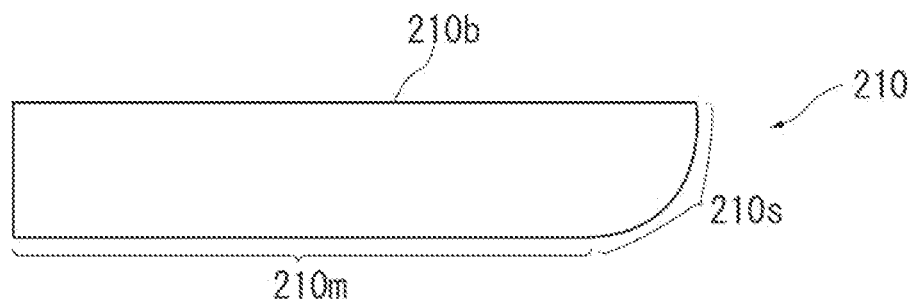
FIG. 16 is a view showing still another modification of the element abutting portion.
Figure 17:
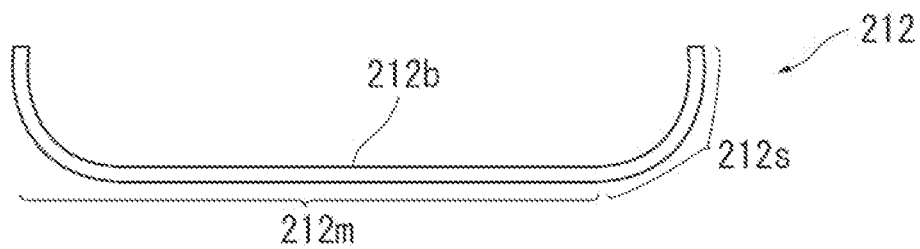
FIG. 17 is a view showing still another modification of the element abutting portion.
Figure 18:
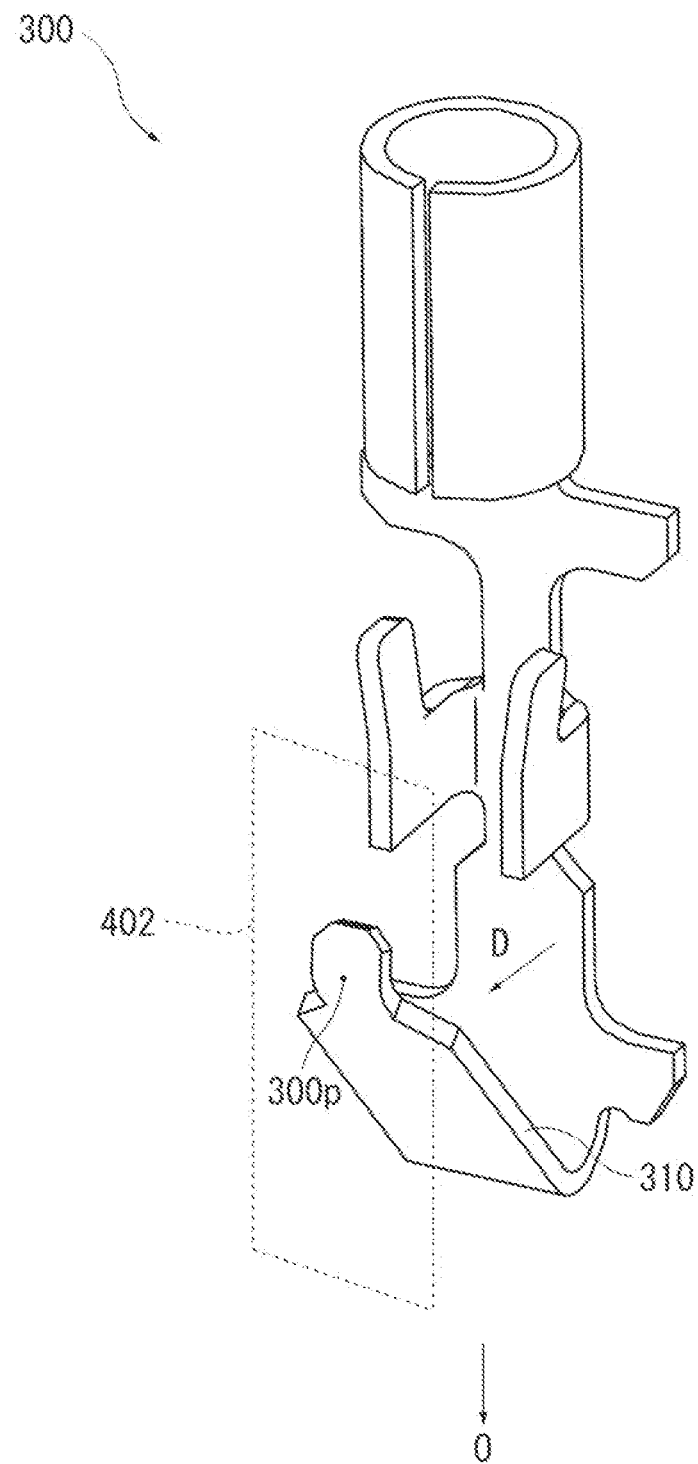
FIG. 18 is a perspective view of a conventional metal terminal member.
Figure 19:
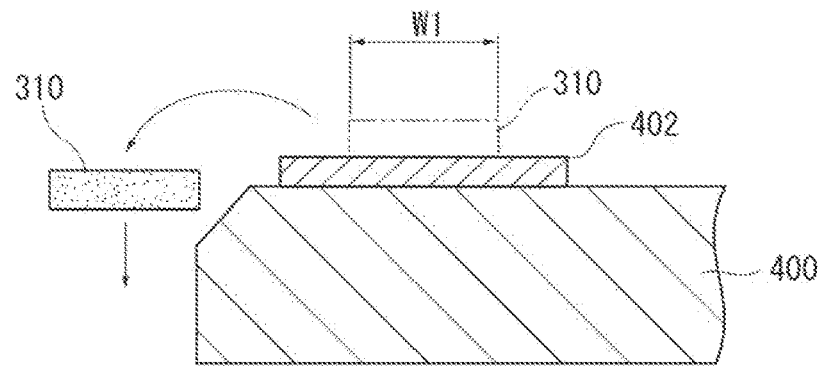
FIG. 19 is a view showing the positional relation between a conventional metal terminal member and an electrode pad on an end portion of a sensor element in the case where the metal terminal member has moved out of place in the width direction.
Figure 20:
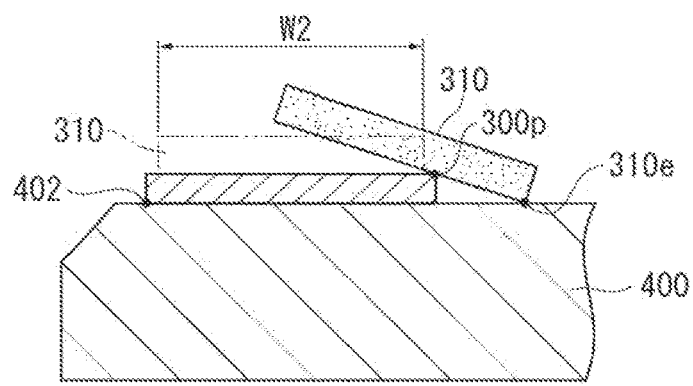
FIG. 20 is a view showing the positional relation between a conventional metal terminal member and an electrode pad in the case where the metal terminal member has moved out of place while inclining.

Also, element abutting portions 210 and 212 shown in FIGS. 16 and 17, respectively, may be employed. The element abutting portions 210 and 212 have curved sloping surfaces 210s and 212s, respectively. Notably, the element abutting portion 210 shown in FIG. 16 is formed by forging and has a flat opposite surface 210b, and the element abutting portion 212 shown in FIG. 17 is formed by press working and has a non-flat opposite surface 212b.

Each metal terminal member is not required to have a two-piece structure and may have a one-piece structure in which the metal terminal member is not separated into a forward end portion and a rear end portion.

Examples of the gas sensor include an oxygen sensor and a full range gas sensor, as well as the NOx senor.

DESCRIPTION OF REFERENCE NUMERALS AND SYMBOLS

1: gas sensor
10: sensor element
10c: chamfered portion
10s: outer surface of the sensor element
11a: electrode pad
11e: end portion of the electrode pad on the chamfered portion side
11c: corner portion of the end portion of the electrode pad
20, 30: metal terminal member (forward-end-side metal terminal member)
21, 31: body portion
22, 32, 202, 204, 206, 208, 210, 212: element abutting portion
22b, 32b, 202b, 204b, 206b, 208b, 210b, 212b: opposite surface of the element abutting portion
22m, 32m, 202m, 204m, 206m, 208m, 210m, 212m: main surface
22s, 32s, 202s, 204s, 206s, 208s, 210s, 212s: sloping surface
22a, 32a, 208a: side surface
O: axial line
B: boundary portion
V: imaginary line segment

The invention claimed is:

1. A gas sensor comprising:
a plate-shaped sensor element extending in a direction of an axial line and having an electrode pad provided on an outer surface of the sensor element at a rear end side thereof; and
a metal terminal member extending in the direction of the axial line and electrically connected to the electrode pad,
the gas sensor being characterized in that
the metal terminal member includes a body portion and an element abutting portion extending from the body portion and bent toward the electrode pad, a portion of the element abutting portion being in contact with the electrode pad in a state in which the element abutting portion is elastically deflected;
the element abutting portion has a flat main surface facing the sensor element, an opposite surface located on a side opposite the flat main surface in a thickness direction of the element abutting portion, and a sloping surface provided on at least one of end portions of the element abutting portion in a width direction of the metal terminal member, the sloping surface being directly connected to the flat main surface and extending toward the side opposite the flat main surface in the thickness direction;
the element abutting portion has a side surface at the at least one of the end portions at which the sloping surface is formed, the side surface being directly connected to the sloping surface and facing outward in the width direction;
the flat main surface, the sloping surface, and the side surface of the element abutting portion are continuously connected in the thickness direction;
the flat main surface is located at a center of the element abutting portion in the width direction; and
the side surface is located at an outermost position of the element abutting portion in the width direction.

2. The gas sensor according to claim 1, wherein, as viewed in the thickness direction of the element abutting portion, a thickness t1 of the sloping surface and a thickness t2 of the side surface satisfy a relation of t1<t2.

3. The gas sensor according to claim 2, wherein a sum of t1+t2 is equivalent to a thickness of the element abutting portion in the thickness direction at the center.

4. The gas sensor according to claim 1, wherein,
the sensor element includes a chamfered portion at a corner portion thereof in the width direction;
the sloping surface is formed on the at least one of the end portions on a side of the element abutting portion in the width direction that is opposite to the chamfered portion;
when the chamfered portion of the sensor element has a chamfering angle θ1, an angle θ2 of the sloping surface in relation to the main surface satisfies a relation of θ1>θ2; and
one of the following two requirements is satisfied:
(1) an end portion of the electrode pad is in contact with a boundary portion between the chamfered portion and the outer surface of the sensor element, or (2) the end portion of the electrode pad on the chamfered portion side is spaced away from the boundary portion and a relation of $\theta 3 > \theta 2$ is satisfied, where $\theta 3$ represents an angle between the outer surface and an imaginary line segment connecting the boundary portion and a corner portion of the end portion of the electrode pad on the side toward the element abutting portion, and a distance L3 between the boundary portion and the end portion of the electrode pad is shorter than a length L2 of the sloping surface as measured parallel to the outer surface.

5. The gas sensor according to claim 1, wherein, in the element abutting portion, the opposite surface located on the side opposite the main surface and the sloping surface in the thickness direction is flat.

6. The gas sensor according to claim 5, wherein the sloping surface is higher in hardness than the main surface.

7. The gas sensor according to claim 1, wherein an overall length L1 of the metal terminal member in the width direction and a length F1 of the main surface in the width direction satisfy a relation of $F1/L1 \leq 0.8$.

8. The gas sensor according to claim 1, further comprising two or more of the metal terminal member, wherein the two or more metal terminal members are arranged in the width direction on at least one of opposite surfaces of the sensor element such that the two or more metal terminal members are spaced from one another.

9. The gas sensor according to claim 1, wherein the element abutting portion includes either (a) one and only one sloping surface; or (b) two and only two sloping surfaces.

10. The gas sensor according to claim 1, wherein the element abutting portion includes two and only two sloping surfaces and the flat main surface extends between and directly contacts an edge of both of the sloping surfaces.

11. The gas sensor according to claim 1, wherein as viewed in the thickness direction of the element abutting portion, a distance between the flat main surface and the opposite surface is a total of a thickness of the sloping surface and a thickness of the side surface.

* * * * *